United States Patent
Hovgaard

(10) Patent No.: US 12,196,177 B2
(45) Date of Patent: Jan. 14, 2025

(54) WIND TURBINE CONTROL BASED ON OPTIMICING AND NON-OPTIMICING CONTROLLER ROUTINES

(71) Applicant: VESTAS WIND SYSTEMS A/S, Aarhus N (DK)

(72) Inventor: Tobias Gybel Hovgaard, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 565 days.

(21) Appl. No.: 17/417,084

(22) PCT Filed: Dec. 17, 2019

(86) PCT No.: PCT/DK2019/050406
§ 371 (c)(1),
(2) Date: Jun. 21, 2021

(87) PCT Pub. No.: WO2020/125901
PCT Pub. Date: Jun. 25, 2020

(65) Prior Publication Data
US 2022/0082083 A1  Mar. 17, 2022

(30) Foreign Application Priority Data
Dec. 21, 2018 (DK) ............................ PA 2018 70848

(51) Int. Cl.
*F03D 7/02* (2006.01)
*F03D 7/04* (2006.01)

(52) U.S. Cl.
CPC ......... *F03D 7/0224* (2013.01); *F03D 7/0296* (2013.01); *F03D 7/045* (2013.01);
(Continued)

(58) Field of Classification Search
None
See application file for complete search history.

(56) References Cited

U.S. PATENT DOCUMENTS 6,295,808 B1 * 10/2001 Griffin .................. F02D 41/062
60/776
6,701,214 B1    3/2004 Wielebski et al.
(Continued)

FOREIGN PATENT DOCUMENTS

CN       107667220 A       2/2018
WO    WO-2017054825 A1 *  4/2017 ............. F03D 7/043
(Continued)

OTHER PUBLICATIONS

Arne Koerber et al., Combined Feedback-Feedforward Control of Wind Turbines Using State-Constrained Model Predictive Control, Published: Jul. 4, 2013; IEEE, pp. 1117-1127 (Year: 2013).*
(Continued)

*Primary Examiner* — Howard Cortes
(74) *Attorney, Agent, or Firm* — Patterson + Sheridan, LLP

(57) ABSTRACT

Wind turbine control based on optimizing and non-optimizing controller routines is disclosed. A first controller implements a model predictive control (MPC) routine for calculating a predicted first control value. A second controller implements a non-optimizing control routine for calculating a second control value. An actuator controller unit determines an actuator control signal by combining the predicted first control value and the second control value.

16 Claims, 3 Drawing Sheets

(52) U.S. Cl.
CPC .......... *F03D 7/047* (2013.01); *F05B 2270/20* (2013.01); *F05B 2270/334* (2013.01); *F05B 2270/404* (2013.01)

(56) References Cited

U.S. PATENT DOCUMENTS

| | | | |
|---|---|---|---|
| 6,717,537 B1 | 4/2004 | Fang et al. | |
| 7,085,692 B2 * | 8/2006 | Jackson | G05B 13/048 700/32 |
| 7,602,875 B2 * | 10/2009 | Sudo | H03H 17/0219 375/372 |
| 10,732,587 B2 * | 8/2020 | Namie | G05B 13/042 |
| 2007/0176428 A1 * | 8/2007 | Nagao | F03D 7/042 290/44 |
| 2008/0071397 A1 | 3/2008 | Rawlings et al. | |
| 2009/0074574 A1 * | 3/2009 | Godsk | F03D 7/022 416/41 |
| 2009/0198350 A1 * | 8/2009 | Thiele | G05B 17/02 700/83 |
| 2010/0087933 A1 * | 4/2010 | Cheng | G05B 19/0423 700/30 |
| 2011/0115233 A1 * | 5/2011 | Schroppel | F16C 19/381 290/55 |
| 2015/0056072 A1 | 2/2015 | Perley et al. | |
| 2016/0041536 A1 * | 2/2016 | Benosman | G05B 13/048 700/31 |
| 2016/0053745 A1 * | 2/2016 | Blom | F03D 7/0264 416/1 |
| 2017/0089325 A1 * | 3/2017 | Timbus | G05B 23/0283 |
| 2017/0226989 A1 * | 8/2017 | Hammerum | F03D 7/045 |
| 2017/0248124 A1 | 8/2017 | Hammerum et al. | |
| 2018/0067461 A1 * | 3/2018 | Namie | G05B 13/048 |
| 2018/0121559 A1 * | 5/2018 | Bare | G06F 16/252 |
| 2019/0022861 A1 * | 1/2019 | Namie | B25J 9/1664 |
| 2020/0173390 A1 * | 6/2020 | Shin | F02D 41/1406 |
| 2020/0189100 A1 * | 6/2020 | Rácz | G05B 19/4103 |
| 2020/0301374 A1 * | 9/2020 | Nakamura | G05B 13/048 |
| 2021/0285419 A1 * | 9/2021 | Warfen | F03D 7/0244 |
| 2022/0082083 A1 * | 3/2022 | Hovgaard | G05B 13/048 |
| 2022/0282879 A1 * | 9/2022 | Chakrabarty | F24F 11/62 |

FOREIGN PATENT DOCUMENTS

| | | | | |
|---|---|---|---|---|
| WO | WO-2017202430 A1 * | 11/2017 | | F03D 7/0224 |
| WO | 2020125901 A1 | 6/2020 | | |

OTHER PUBLICATIONS

PCT, International Search Report for Application PCT/DK2019/050406 dated Jun. 15, 2020.
PCT, Written Opinion of the International Searching Authority for Application PCT/DK2019/050406 dated Jun. 15, 2020.
Danish Patent and Trademark Office, Search Opinion, for Application PA 2018 70848 dated Jun. 26, 2019.
Danish Patent and Trademark Office, Search Report, for Application No. PA 2018 70848 dated Jun. 26, 2019.
Danish Patent and Trademark Office, 1st Technical Examination of Patent Application PA 2018 70848 dated Jun. 26, 2019.
European Patent Office, Communication Pursuant to Article 94(3) EPC for Application 19 827 613.1-1205 dated Dec. 11, 2023.
China National Intellectual Property Administration, Office Action for Chinese Patent Application No. 201980092269.9, dated Jan. 4, 2024.

* cited by examiner

WIND TURBINE CONTROL BASED ON OPTIMICING AND NON-OPTIMICING CONTROLLER ROUTINES

FIELD OF THE INVENTION

The present invention relates to control of wind turbines, and in particular to wind turbines with control systems comprising both optimizing controller units, such as MPC controller units, and non-optimizing controller units.

BACKGROUND OF THE INVENTION

Wind turbines are commonly used to supply electricity into the electrical grid. In general, a wind turbine or a wind turbine park is operated with the aim to obtain maximum yield of the capital invested in it, and consequently the wind turbine control systems are configured to maximize the output power, i.e. to operate the wind turbine to capture the maximal power that is available in the wind, with due regard to keeping the wind turbine within operational limits.

Different types of wind turbines exist, modern wind turbines are often of the variable speed type. For such a wind turbine the generator torque and the pitch angle of the blades are controlled to keep such parameters as aerodynamic torque, rotor speed and electrical power within an operational envelope depending on design parameters and operational conditions.

Modern turbines are operated by a number of computerized controllers which based on input signals determines actuator output signals. Many turbine controllers are implemented as feedback controllers of the PID-type. PID-type controllers are well-known and reliable controllers. Wind turbines are quite complex machines operating in complex, varying and often unpredictable environment. There may therefore be an advantage in applying more advanced control techniques of the multiple input, multiple output (MIMO) type. One example of such advanced controller is a controller based on the so-called Model Predictive Control (MPC) methodology.

WO2011/076295 discloses a wind turbine having a control method and controller for performing predictive control, hereunder MPC, of a wind turbine generator based on wind speed obtained at a predetermined distance in front of the rotor.

WO2016/023561 discloses a wind turbine have a control system arranged for controlling a predicted control trajectory, e.g. by an MPC controller, and a safety controller for controlling the wind turbine in accordance with a safe-mode control trajectory. The safe-mode control trajectory may or may not be calculated by an optimizing controller. In the disclosure, the wind turbine is controlled either based on the predicted control trajectory or based on the safe-mode control trajectory.

Wind turbine control based on MPC is challenged by the rather involved computations for executing an MPC algorithm for real-time control, where actuator setpoints are often calculated between a few Hz and 100 Hz.

It is against this background that the invention has been devised.

SUMMARY OF THE INVENTION

It would be advantageous to achieve control of a wind turbine which is capable of supporting advanced model-based real-time control of at least selected control features.

Accordingly, in a first aspect, there is provided a wind turbine control system comprising: a first controller unit implementing a model predictive control (MPC) routine for calculating a predicted operational trajectory of a predicted operational signal, where a trajectory comprises a time series of at least one variable, and where a trajectory includes a predicted first control value; a second controller unit implementing a non-optimizing controller for calculating a second control value; and an actuator controller unit arranged for determining an actuator control signal by combining the predicted first control value and the second control value.

The inventor of the present invention has realized that actuator control signals can be split up in sub-signals which are determined by different controller units implemented in accordance with different control principles. By basing part of the actuator signal on values determined by an MPC routine, the benefits of MPC can be obtained for the selected control variables forming part of the combined actuator control signal, whereas other selected control variables can be handled by the computational simpler non-optimizing control type. In this manner, MPC can be applied for wind turbine control in real-time without relying on computing power that are not available in modern wind turbines. Moreover, in general certain control aspects may beneficially be handled by a non-optimizing control routine, whereas as other control aspects are beneficially handled by an optimizing control routine. Embodiments of the present invention thereby allow for selecting which type of control routine that is used for the different control tasks, irrespectively of the computing power available in the turbine.

In this regard a non-optimizing controller is to be understood as a controller which based on input determines an output, where the output is determined based on a calculation which cannot be understood as a numerical optimization. In particular, which is not based on a real-time optimization or online optimization. The non-optimizing controller algorithm may have undergone prior tuning or may include tuning parameters which are varied based on input. Such tuning is not to be understood as an optimization. In general, the non-optimizing controller may be based on arithmetic calculations, logical calculations, feedback control loops, feedforward control loop, hereunder PID, PI or other feedback controllers.

The control system thus comprises three controller units, however further units may be present. The first controller unit is an MPC controller, the second controller unit is a classic controller unit being based on non-optimizing control, and the third controller unit is an actuator controller. The actuator controller may be a controller for any actuator in the wind turbine, including but not limited to pitch actuators and power actuators. The power actuator may be elements of the generator-converter system which is decisive for the resulting generator torque. The generator torque may be controlled via a power setpoint or a torque setpoint received by the converter controller arranged for controlling relevant elements of the generator-converter system. Further actuators may also be envisioned, such as active aerodynamic elements, mechanical damper elements, etc.

The actuator control signal is obtained by combining the predicted first control value and the second control value. In this manner the actuator control signal comprises a signal contribution from the first control value and a signal contribution from the second control value. The combination of the first and second control value may be done by appropriate hardware, however it is typically implemented as a software combination. The combination may be obtained by a functional implementation where a mathematical function takes as input the first control value and the second control value, optionally together with further values to determine the actuator control signal. In an embodiment the combination of the control values may comprise a summation of the first and the second control values and a weighted summation of the first and the second control values. In embodiments the weights may be scalar weights, however the weights may also be scheduled (e.g. scaled) according to an operational point of the wind turbine, such as scheduled according to a wind speed, a rotor speed, a power output, etc. In a general example the combination may comprise superposing a mathematical function dependent on the first control value and a mathematical function dependent on the first control value.

The control system may handle more than two control values and the resulting actuator control signal may be based on a number of predicted control values and a number of further control values being determined by non-optimizing controller units.

The model predictive control routine may be implemented for online optimization, such as real-time optimization. The first and second controllers may be implemented to operate in parallel. This may be achieved by parallel processing on dedicated processing equipment, or it may be achieved by proper programming for parallel processing on same processing equipment.

The various controller units of the control system may operate at different sample rates and advantageously the actuator controller unit comprises a sampling unit which is arranged for receiving the predicted first control value at a first sampling rate and is arranged for receiving the second control value at a second sample rate, and wherein the sampling unit is arranged for adjusting the sampling rate of at least one of the predicted first control value and the second control value to output the actuator control signal at an output sample rate.

In embodiments, an actuator setting may be based on different control values which combines into a single actuator setpoint. Thus, the predicted control value may relate to a first control value, and the second control value may relate to a different second control value. For example, the first control value may relate to a collective pitch value directed to control the aerodynamical energy uptake of the rotor, whereas the second control value may relate to a cyclic pitch value directed to dampen tower vibrations. The second control value may also relate to a value determined by a supervision system to ensure fast reaction to a given turbine state.

In embodiments, the second control values are determined to reduce out-of-plane rotor forces and/or to reduce tower vibrations.

In embodiments, the predicted first control value is at least one of the control value for setting the collective pitch and the control value for setting the output power. For the predicted first control value being the control value for setting the collective pitch, the second control value may be a cyclic varying value for super-imposing cyclic pitch variation to the collective pitch value. For the predicted first control value being the control value for setting the output power, the second control value may be a cyclic varying value for super-imposing cyclic power variation to the output power.

In embodiments the control system may be communicatively connected to a supervision system, which based on sensor inputs and/or other inputs, such as actuator state inputs, determines a turbine state and compare this turbine state to various operational limits or thresholds. In such an embodiment, the second control values are values relating to supervision, to ensure a predefined actuator control signal in view of a wind turbine state being outside a predefined operational state supervised by an associated supervision system. In an embodiment, the second controller unit receives an input from the supervision system and based on that input calculates a second control value. This may advantageously be implemented to ensure a fast reaction to a given situation. For example, a fast reaction to a weather situation, e.g. a large gust, a fast reaction to a faulty component, or other situations where it may be advantageous to ensure a fast actuator response.

Advantageously, the control system takes into account a situation where a valid solution to the optimization problem either does not exists, or that there is not sufficient computational power available in order to find a valid solution within an acceptable time. In embodiments, the first controller unit comprising a fault unit which monitors an optimization routine of the MPC routine, and if the optimization routine does not provide a valid solution to the optimization during a predetermined time, the fault unit sends out a fault signal. In an embodiment, the fault unit may monitor a solver implemented by the MPC routine, to ensure that the solver provide a valid solution.

In embodiments, the fault signal may comprise an override control value to replace the predicted control value, the override control value being the last determined valid predicted control value. This may ensure that, while a current valid control value is not available, the wind turbine is nevertheless being controlled in accordance with a validated control value. A prior determined control value may be valid, but the validity may only last for a given time. The fault unit may monitor the number of samples passing by without a valid solution being obtained, and if the number of samples is larger than a predefined threshold value, the fault signal is a shutdown signal of the wind turbine. In this manner it can be ensured that the turbine is only operated based on control values to which a high certainty of validity can be assigned.

In a second aspect, the invention relates to a method of controlling a wind turbine control system, the method comprising: calculating using a model predictive control (MPC) routine a predicted operational trajectory of a predicted operational signal, where a trajectory comprises a time series of at least one variable, and where a trajectory includes a predicted first control value; calculating using a non-optimizing control routine a second control value; and combining the predicted first control value and the second control value to an actuator control signal.

In further aspects, the invention relates to a wind turbine comprising the control system according to the first aspect and a computer program product comprising software code adapted to control a wind turbine when executed on a data processing system, the computer program product being adapted to perform the method of the second aspect.

The computer program product may be provided on a computer readable storage medium or being downloadable from a communication network. The computer program product comprises instructions to cause a data processing system, e.g. in the form of a controller, to carry out the instruction when loaded onto the data processing system.

In general, a controller may be a unit or collection of functional units which comprises one or more processors, input/output interface(s) and a memory capable of storing instructions can be executed by a processor.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 schematically illustrates an embodiment of a control system together with elements of a wind turbine.

DESCRIPTION OF EMBODIMENTS

Figure 1:
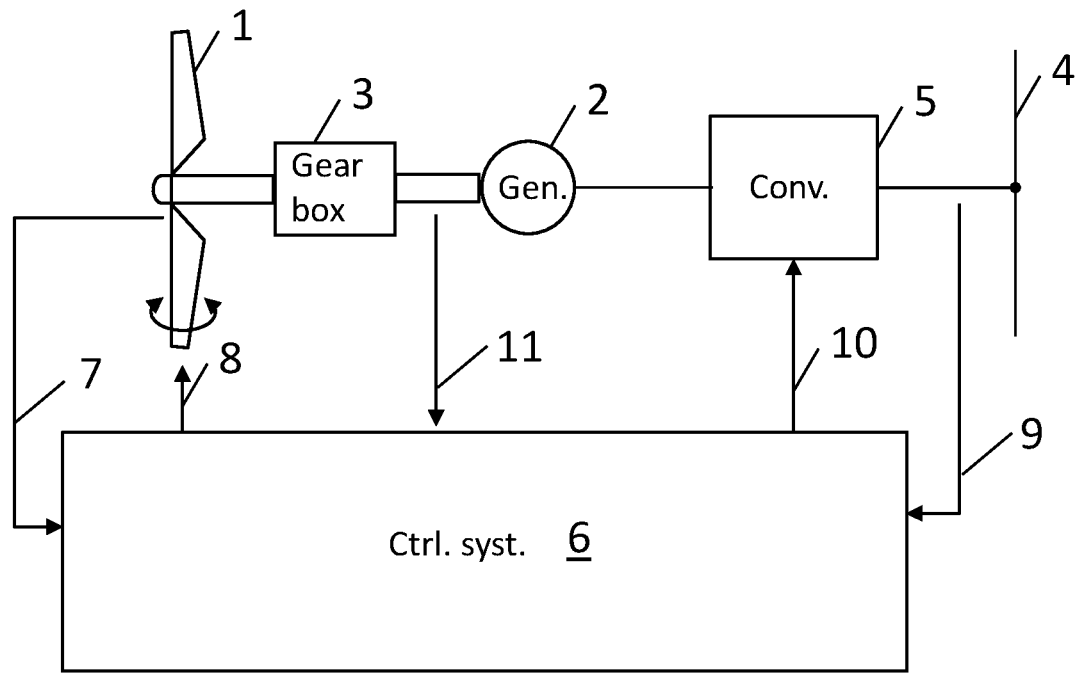

FIG. 1 schematically illustrates an embodiment of a control system 6 together with elements of a wind turbine. The wind turbine comprises rotor blades 1 which are mechanically connected to an electrical generator 2 via gearbox 3. In direct drive systems, and other systems, the gear box may not be present. The electrical power generated by the generator 2 is injected into a power grid 4 via an electrical converter 5. The electrical generator 2 and the converter 5 may be based on a full-scale converter architecture or a doubly fed induction generator (DFIG) architecture, but other types may be used.

The control system 6 comprises a number of elements, including processor and a memory, so that sub-units of the control system is capable of executing computing tasks based on instructions stored in the memory. In general, the wind turbine controller 6 ensures that in operation the wind turbine generates a requested power output level within design limits. This is obtained by adjusting the pitch angle and/or the power extraction of the converter. To this end, the control system 6 instructs a pitch system using a pitch reference 8, and a power system using a power reference 10. The control system receives a number of input signals, hereunder the pitch positions 7 of each rotor blade, the grid power 9, the rotor speed 11. Moreover, a number of other sensor values are made available to the elements of the control system. In the figure two rotor blades are shown, however any number of rotor blades may be used, in particular three rotor blades.

The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades. The split in common pitch system and individual pitch system is to a certain extent logical or controller based, as only a single pitch reference is sent to each pitch actuator of the blades. This single pitch reference may be a combined signal of the common pitch reference, the individual pitch reference, and potentially also other contributions. Also the common pitch reference and the individual pitch reference may be based on contributions from different determinations.

The common pitch is set as a common pitch setting for all blades and is used for controlling the aerodynamic torque of the rotor and the rotor thrust. The individual pitch is set as an individual pitch setting for each blade. The individual pitch may be implemented as a cyclic pitch setting which is based on a common reference value that is phase adjusted 120°. The phase adjusted signal will impose a cyclic variation if super-imposed on the collective pitch. The individual pitch system is often used for load relieving activities.

Figure 2:
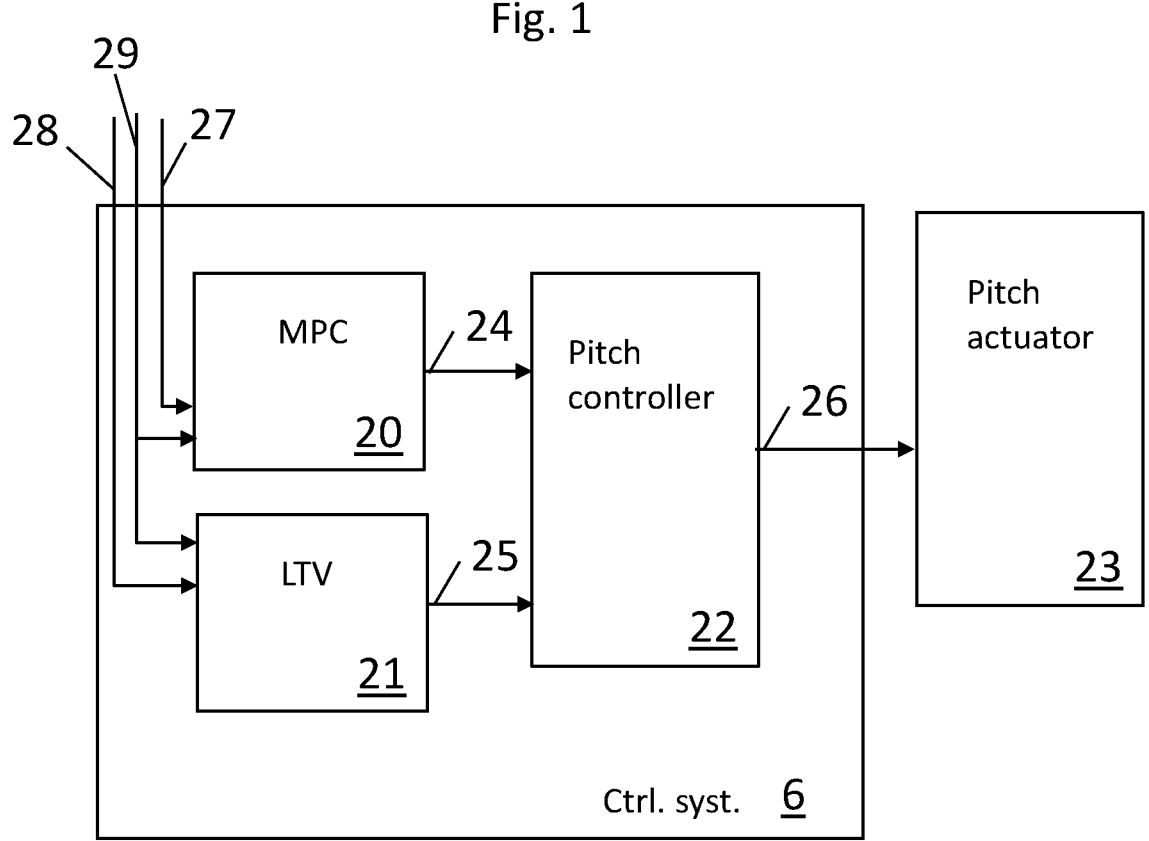
FIG. 2 illustrates an embodiment of the wind turbine control system.

FIG. 2 illustrates an embodiment of the wind turbine control system 6 comprising a first controller unit 20 implemented as an MPC controller unit to calculate a predicted control value 24 and a second non-optimizing controller unit 21 implemented to calculate a second control value 25. In the illustrated embodiment of FIG. 2 and FIG. 3, the MPC controller unit is implemented for calculating the predicted control value in the form of the collective pitch reference, whereas the second controller 21 is implemented for calculating a different second control value in the form of a pitch signals for reducing the lateral tower vibrations. The two controllers are implemented to operate in parallel, meaning that they are both active at the same time being able to operate in an independent manner.

Further examples of alternative implementations are provided below.

The MPC (first controller unit) calculates a predicted control value 24 in the form of a collective pitch reference, and the lateral tower vibration unit (second controller unit) calculates a pitch contribution for each blade for reducing the lateral tower vibration. The two pitch signals are input into an actuator controller unit 22 in the form of a pitch controller which combines the signals into an actuator control signal 26 to be input into the actual pitch actuators 23 of each blade.

The MPC routine and the non-optimizing control routine are based on various inputs 27-29, such as turbine state input, sensor input, actuator input. Depending on the specific implementations, the inputs may be input 27 dedicated to the MPC, input 28 dedicated to the non-optimizing control routine, or shared input 29.

Figure 3:
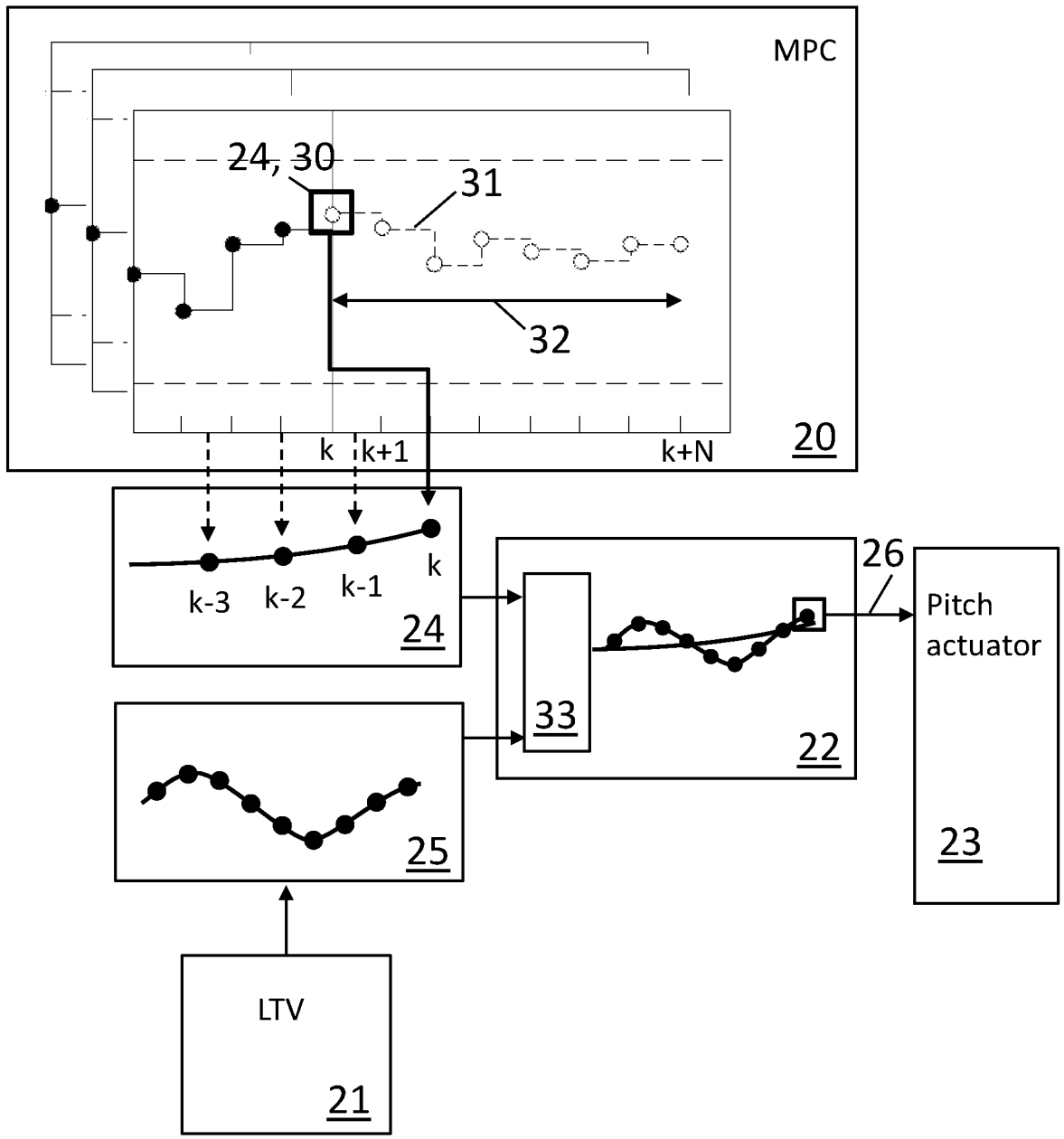
FIG. 3 further illustrates elements of the embodiment of FIG. 2.

FIG. 3 further illustrates elements of the embodiment of FIG. 2, including signals involved in determining the pitch actuator control signal.

FIG. 3 illustrates the MPC controller 20 which repeatedly calculates a predicted operational trajectory 31 also sometimes referred to as a prediction horizon. An MPC routine is a receding horizon control routine which optimizes the current timeslot, k, while taking future timeslots into account, here shown as the prediction horizon 32 comprising k+N steps. This is achieved by optimizing a finite timehorizon, using the current timeslot 30 as the control value 24 and then optimize again, repeatedly. The operational trajectory comprises a time series of at least one variable, here the collective pitch setpoint, and includes a predicted control value 24, 30, taken as the current predicted control value. This is illustrated in FIG. 3 where for each current optimization and resulting predicted trajectory, the current predicted value 30 is taken as the actuator setpoint 24 for the collective pitch, shown as actuator setpoint for timeslots k−3 to k.

The lateral tower vibration unit 21 receives as input a signal representing the lateral tower vibration. This may for example be a signal representing the lateral velocity of the tower top of the wind turbine, and as an output 25 is a pitch correction signal for each blade. This pitch correction signal will generate a force which results in a damping of the lateral tower top movement. This controller unit is a non-optimizing controller unit, since the output value is not the result of an optimization. Instead, the output value is calculated based on an input sensor signal. This signal possibly being data processed, including gain adjustment, to generate a control signal.

The collective pitch signal determined by the MPC and the lateral damping signal determined by the lateral tower vibration unit are input to an actuator controller unit 22 which combines the two signals to generate an actuator control signal 26 for the pitch actuator 23.

FIG. 3 shows a single MPC calculated control variable, but the control system will generally operate with a number of operational trajectories of both operational variables and control values. The operational trajectories and control trajectories may include, but are not limited to, one or more of the following parameters: pitch value, including collective pitch values and individual pitch values, rotor speed, rotor acceleration, tower movement, power related parameters, torque related parameters and derivatives of these parameters, as well as to such parameters as generated power Pg, power extracted from the wind Pw, available power in the wind Pay, and the kinetic energy in the rotating system K.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, θ, rotor angular speed, co, and tower top position, s, as well as time derivatives of those parameters. Other and more parameters may be used to define the wind turbine state, x*. In general the operational trajectory includes operational parameters which are used to calculate the desired fatigue load measure.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g. in the form of a dedicated computational unit in charge of determining the current operational state, such as an observer or a Kalman filter.

The trajectory may be expressed as a control trajectory. An example control trajectory may be:

$$u_1^* = \begin{bmatrix} \theta_{ref} \\ P_{ref} \end{bmatrix}$$

comprising the collective pitch reference signal and the power reference signal. Other and more parameters may be used to define the wind turbine control signal, $u_1^*$.

FIG. 3 shows a trajectory 31 of a control value for a number of discrete time steps. The figure shows the current time, k, as well as a number of past time steps and a number of future time steps 32. Known values are marked with a solid circle, whereas predicted values are marked with an open circle. A trajectory may comprise a time series of predicted values, i.e. only the open circles. The trajectory need not include the past and known values, but may do in certain embodiments. The trajectory may span a time series of a few seconds, such as 5-seconds. However, the trajectory may be longer or shorter depending on the given implementation.

Model Predictive Control (MPC) is a multivariable control algorithm that uses an optimization cost function J over the receding prediction horizon, to calculate the optimal control moves.

The optimization cost function may be given by:

$$J = \sum_{i=1}^{N} w_{y_i}(r_i - y_i)^2 + w_{u_i}\Delta u_i^2$$

where $r_i$ is the set-point for the i-th variable, $y_i$ and $u_i$ being i-th trajectory variables, and $w_{y_i}$ being weight matrix defining the relative importance of this variable, and $w_{u_i}$ being weight matrix defining the penalty related to changes in this variable.

In another embodiment, the MPC may be implemented as a so-called economic optimizing MPC or just economic MPC. In economic MPC the optimization is based on a maximization of the cost function on the form:

maximize (Power—$\lambda_1$ Fatigue—$\lambda_2$ Noise—$\lambda_3$ Pitch rate— . . . ), where $\lambda_1$-$\lambda_3$ are tuneables. Such cost function is often called an objective function.

The optimization problem may in an embodiment be solved by a change of variables, to a formulation where the pitch and torque are treated as variables derived from the powers, e.g. in a parameter space where generator power, power extracted from the wind and kinetic energy is optimized. This is e.g. disclosed by T. Hovgaard, S. Boyd, and J. Jorgensen, in Model Predictive Control for Wind Power Gradients. Wind Energy, 18(6):991-1006, 2015. In such an embodiment, the MPC calculation may comprise three layers: a pre-processing layer, a solving layer and a post-processing layer. In the pre-processing such steps as transformation of the measured values of pitch and generator speed into corresponding powers. Also constraints are determined, the turbine state is estimated, etc. A result of the pre-processing is that the objective function is defined in a form which can be input into a solver. In the solving layer, a maximum of the objectivity function is found. The solver being a computing unit arranged to find an optimum, preferably a global optimum of the objective function. This optimum, will be an optimum expressed in power variables. In a post processing, the optimizing values are back-transformed into the control values in the form of pitch and generator speed. These optimized values are then used in the control.

In an embodiment, the MPC controller 20 operates at a first sampling rate. Due to the rather heavy computations that are involved in the optimization of the cost function, the sampling rate is normally set at a compromise between available computing resources and ideal sampling rate. The non-optimizing controller, on the other hand, is typically not limited in sampling rate since the involved computations are of the digital filter type, such as FFT, band pass filtering, as well as arithmetic calculations. In an example, the sampling rate of the MPC controller is a few Hz, whereas the sampling rate of the non-optimizing controller is a few tens of Hz.

In an embodiment, the actuator controller unit 22 comprises a sampling unit 33 which is arranged for receiving the predicted first control value at a first sampling rate and the second control value at a second sample rate. Generally, the sampling unit is arranged for adjusting the sampling rate of at least one of the predicted first control value and the second control value to output the actuator control signal at an output sample rate. In FIG. 3 the sampling rate of the predicted first control value is adjusted to match the second control value, so that the sampling rate of the pitch actuator match the sampling rate of the non-optimizing controller. In the figure, the sampling unit 33 operates as an up-sampling unit, but may alternatively also operate as a down-sampling unit. Depending on the circumstances, the sampling unit is implemented in a manner so that it can take signals at different sampling rates and output a combined signal at a selected output sample rate. The output sample rate being selected so that it matches the relevant sampling rate of the actuator in question, here the pitch actuator.

The model predictive control routine 20 is implemented for online optimization. Thus, the MPC controller is determining control values for real-time use, for example as mentioned, control values at a sampling rate between a few Hz and 100 Hz.

The MPC operates based on performing optimization of a multi-dimensional cost function. In the event a valid solution to the optimization problem cannot be found, either because a valid solution is not present, or because a valid solution may take too long time, the controller unit may include a fault unit which monitors the optimization routine of the MPC, and if the optimization routine does not provide a valid solution to the optimization during a predetermined time, the fault unit sends out a fault signal. This may e.g. be implemented in the solving layer as a monitoring routine that monitors whether or not the solver reaches a valid solution within a predefined time.

In an embodiment, the fault unit stores at least the values of the last valid prediction horizon, and in the event a valid current value is not available, the fault signal is an override control value to replace the predicted control value, the override control value being the last determined valid predicted control value, i.e. the values 31 of the last valid prediction horizon.

In an embodiment, the fault unit monitors the number of samples passing by without a valid solution being obtained, and if the number of samples is larger than a predefined threshold value, the fault signal is a shutdown signal of the wind turbine. For example, if 5 samples having passed without a valid new solution, the turbine is shutdown. The first couple of values in the prediction horizon may be of sufficient credibility that the turbine may operate based on those.

Figure 4:
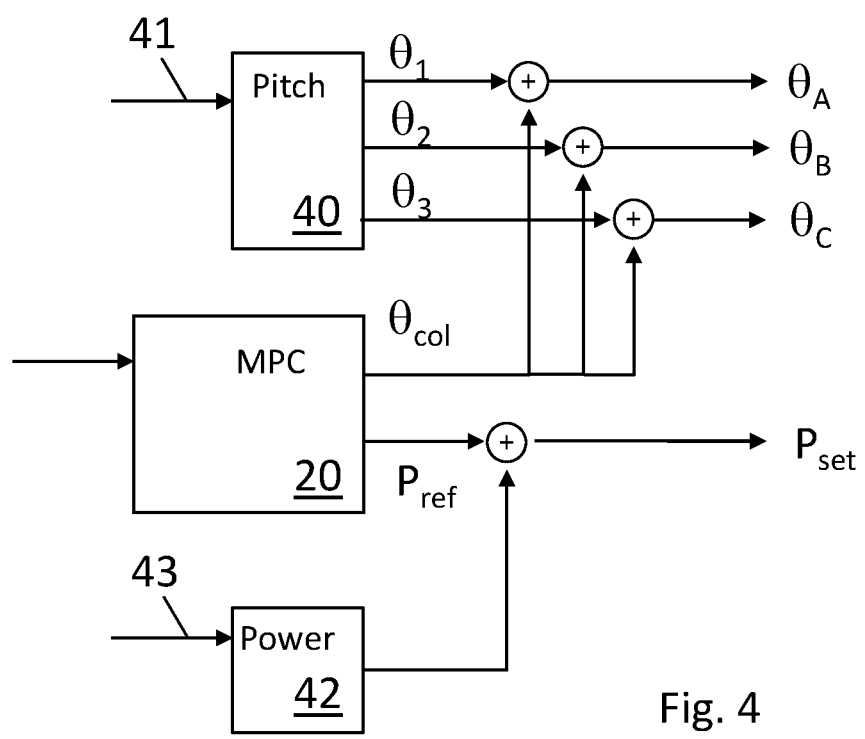
FIG. 4 illustrates an embodiment of the MPC controller unit being implemented to output two predicted control values.

FIG. 4 illustrates an embodiment where the MPC is implemented to output two predicted control values, i.e. a first predicted control value and a second predicted control value. One predicted control value is the collective pitch, $\theta_{col}$, and one predicted control value is the output power reference for the generator $P_{ref}$.

FIG. 4 further shows two non-optimizing controllers. One controller 40 for calculating an individual pitch contribution for super-imposing onto the collective pitch, $\theta_1$-$\theta_3$. The individual pitch contribution may in embodiments be determined as cyclic varying values super-imposed onto the collective pitch value to provide actuator values $\theta_A$-$\theta_C$ for the three pitch actuators. The individual pitch contributions may in embodiments be determined for a number of reasons.

Depending on the object of the individual pitch contributions, different input signals 41 may be used by the individual pitch controller.

In one embodiment, the individual pitch contributions may be determined to reduce shear or veer. In such an embodiment angular position in the rotor plane or blade load sensors may be used as input, and based on that an individual pitch contribution is determined to reduce the shear or veer.

In another embodiment, the individual pitch contribution may be of a general out-of-plane load reduction nature to reduce loads on the main bearing, often referred to as tilt-yaw control. In such an embodiment blade load sensors or axis load sensors may be used as inputs.

In yet another embodiment, the individual pitch contribution may be of tower load reducing nature, such as vibrational damping of tower movement. For both fore-aft movement and sideways movement, the input may be accelerometer data, and the output is individual pitch contributions which generates a force in the relevant direction. In relation to fore-aft vibration damping the output may be a single pitch modulation to modulate the collective pitch to provide a thrust modulation onto the rotor.

More and further examples of individual pitch contributions may be present. In all situations, a controller implemented to take one or more inputs 41 and provide individual pitch contributions as output ($\theta_1,\theta_2,\theta_3$). The individual pitch contributions are super-imposed onto the collective pitch value $\theta_{col}$ 1 to provide actuator control signals, here in the form of three pitch actuator signals ($\theta_A,\theta_B,\theta_C$) for the pitch actuators of the individual blades.

As is also shown in FIG. 4 is a second controller unit 42 for calculating a control value for modifying the predicted power reference ($P_{ref}$).

In an embodiment the power controller is a controller for calculating a signal for reducing sideways tower vibrations. In this embodiment, a signal representing sideways tower vibrations, e.g. an accelerometer signal, is input 43, and cyclic power variation for reducing the tower vibrations is calculated and super-imposed to the power reference to provide a power setpoint, $P_{set}$. The power setpoint being a signal with a DC component corresponding to the power reference, and an overlaying power modulation to reduce sideways tower movement.

In another embodiment, the power controller is a controller for calculating a temporary power boost. In this situation, the input may be an external communication input requesting a temporary over-production. In this situation the power controller calculates a power pulse to be super-imposed onto the power reference.

Example embodiments of the invention have been described for the purposes of illustration only, and not to limit the scope of the invention as defined in the accompanying claims.

The invention claimed is:
1. A wind turbine control system comprising:
a first controller unit implementing a model predictive control (MPC) routine for calculating a predicted operational trajectory of a predicted operational signal, where the trajectory comprises a time series of at least one variable, where the trajectory includes a predicted first control value, where the first controller unit comprises a fault unit that monitors a number of samples passing by without obtaining a valid solution to an optimization routine of the MPC routine, and where the fault unit sends a shutdown signal of the wind turbine if the number of samples exceeds a threshold value;

a second controller unit implementing a non-optimizing controller for calculating a second control value; and an actuator controller unit arranged for determining an actuator control signal based on a sum of the predicted first control value and the second control value.

2. The wind turbine control system according to claim 1 wherein the actuator controller unit comprises a sampling unit which is arranged for receiving the predicted first control value at a first sampling rate and is arranged for receiving the second control value at a second sample rate, and wherein the sampling unit is arranged for adjusting the sampling rate of at least one of the predicted first control value and the second control value to output the actuator control signal at an output sample rate.

3. The wind turbine control system according to claim 1 where the predicted first control value relates to a first control value, and where the second control value relates to a second control value, the first and second control values being different control values.

4. The wind turbine control system according to claim 1 where the model predictive control routine is implemented for online optimization.

5. The wind turbine control system according to claim 1, wherein the first and second controllers are implemented to operate in parallel.

6. The wind turbine control system according to claim 1 wherein the predicted first control value is at least one of the control value for setting a collective pitch and the control value for setting an output power.

7. The wind turbine control system according to claim 1 wherein the predicted first control value is the control value for setting a collective pitch and the second control value is a cyclic varying value for super-imposing cyclic pitch variation to the collective pitch value.

8. The wind turbine control system according to claim 7 wherein second control values are determined to reduce out-of-plane rotor forces.

9. The wind turbine control system according to claim 7 wherein second control values are determined to reduce tower vibrations.

10. The wind turbine control system according to claim 1 wherein the predicted first control value is the control value for setting an output power and the second control value is a cyclic varying value for super-imposing cyclic power variation to the output power.

11. The wind turbine control system according to claim 1 wherein the second control values are values relating to supervision, to ensure a predefined actuator control signal in view of a wind turbine state being outside a predefined operational state supervised by an associated supervision system.

12. The wind turbine control system according to claim 1 wherein:

the actuator controller unit comprises a sampling unit which is arranged for receiving the predicted first control value at a first sampling rate and is arranged for receiving the second control value at a second sample rate, and wherein the sampling unit is arranged for adjusting the sampling rate of at least one of the predicted first control value and the second control value to output the actuator control signal at an output sample rate; and the predicted first control value relates to a first control value, and where the second control value relates to a second control value, the first and second control values being different control values.

13. The wind turbine control system according to claim 1 wherein:

the model predictive control routine is implemented for online optimization; and the first controller unit comprising a fault unit which monitors an optimization routine of the MPC routine, and when the optimization routine does not provide a valid solution to the optimization during a predetermined time, the fault unit sends out a fault signal.

14. A method of controlling a wind turbine control system, the method comprising:

calculating using a model predictive control (MPC) routine a predicted operational trajectory of a predicted operational signal, where the trajectory comprises a time series of at least one variable, and where the trajectory includes a predicted first control value;

monitoring a number of samples passing by without obtaining a valid solution to an optimization routine of the MPC routine;

sending a shutdown signal of the wind turbine if the number of samples exceeds a threshold value;

calculating a second control value using a non-optimizing control routine; and determining an actuator control signal based on a sum of the predicted first control value and the second control value.

15. The method of claim 14, further comprising receiving, by a sampling unit, the predicted first control value at a first sampling rate and is arranged for receiving the second control value at a second sample rate, and wherein the sampling unit is arranged for adjusting the sampling rate of at least one of the predicted first control value and the second control value to output the actuator control signal at an output sample rate.

16. The method of claim 15, where the predicted first control value relates to a first control value, and where the second control value relates to a second control value, the first and second control values being different control values.

* * * * *